United States Patent Office 3,322,456
Patented May 30, 1967

3,322,456
PIPE-GRIPPING DEVICE USED FOR PULLING AND RUNNING OPERATIONS IN THE BORING OF WELLS
Vladimir Alexandrovich Strakhal, 4 ulitsa Oktyabrskogo Polya 9, kv. 50; Jury Borisovich Zitser, ulitsa Vorovskogo 29/36, kv. 8; and Boris Mikhailovich Rebrik, Leninsky prospect 86, kv. 2H, all of Moscow, U.S.S.R.
Filed May 17, 1965, Ser. No. 456,407
3 Claims. (Cl. 294—88)

The invention relates to devices used for gripping casing pipes or the like and holding them in place as well as for screwing casing pipes or drill pipes together and unscrewing them when boring wells in rock.

At present there are known clamp-type devices which are manually fastened on the pipes by means of bolts. Casing spiders, eccentric and split clamps are also known. The latter are provided with a frame, levers with dies and a drive.

To prevent distortion of the pipes, the conventional gripping devices are fitted with replacement bushings which are held on the mandrel body by means of bolts and nuts. The bushings are so chosen that their curvature corresponds to those of the pipes handled.

Replacement of these bushings involves much difficulty during their mounting and dismantling which is performed over the well heads. This is a labor-consuming job calling for manual operations such as unscrewing the nuts, removing the bolts, removing and replacing the bushings, and then reinstalling and fastening the bolts. When doing all this, the operator runs the risk of dropping the bushings, bolts or nuts into the well head which may result in work stoppage and even breakdowns.

If the production process calls for removing the pipe-gripping device from the well head while the pipe ends are high above the ground, the gripping device must be dismantled, which makes the replacement of bushings a difficult matter.

A considerable disadvantage common to all conventional gripping devices is that their parts, or devices as a whole, must be dismantled and then remounted.

An object of this invention is to eliminate the above disadvantages.

A further object of the invention is to provide a pipe-gripping device which ensures a quick and convenient adapting of a working member for handling various diameters of pipes and capable of resisting a considerable torque.

This is achieved by a pipe-gripping device in which each mandrel is provided with segments having surfaces of different curvature.

To center the pipe-gripping device relative to the pipe to be gripped, an auxiliary mandrel can be provided between the levers. The axles on which the mandrels are set can have three sections in which the lower section is of a cylindrical shape, the upper section is in the form of a polyhedral prism, and the middle section is in the form of a square prism with two recesses on one of its sides which accommodate spring-loaded balls of stops mounted in the body of the mandrel.

The gripping device described herein can be used in a device employed for screwing the pipes together or for unscrewing them during pulling and running operations when performing casing jobs or when drilling rock.

For a better understanding of the invention, a gripping device is described below with reference to the accompanying drawings wherein.

Figure 1:
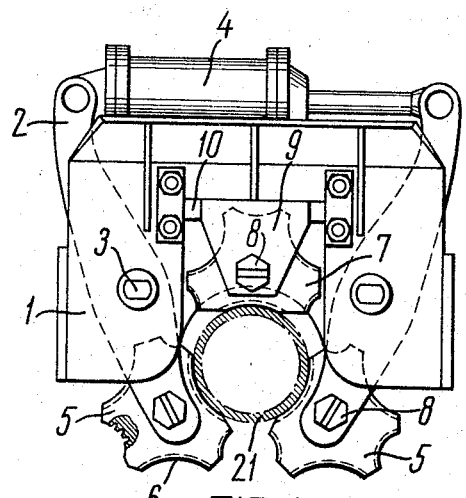
FIG. 1 is a side view of the device shown when gripping the pipe.
Figure 2:
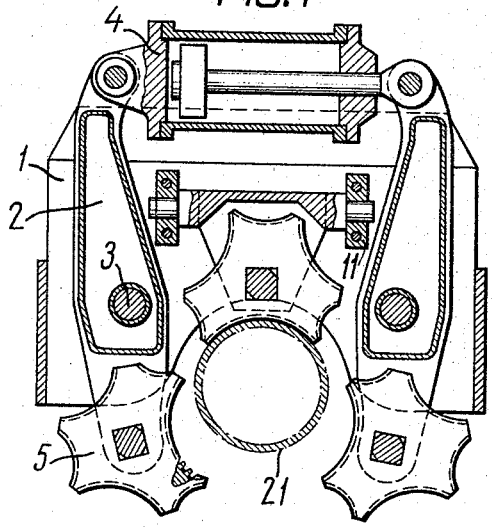
FIG. 2 shows the device in FIG. 1 in cross-section when releasing the pipe.
Figure 3:
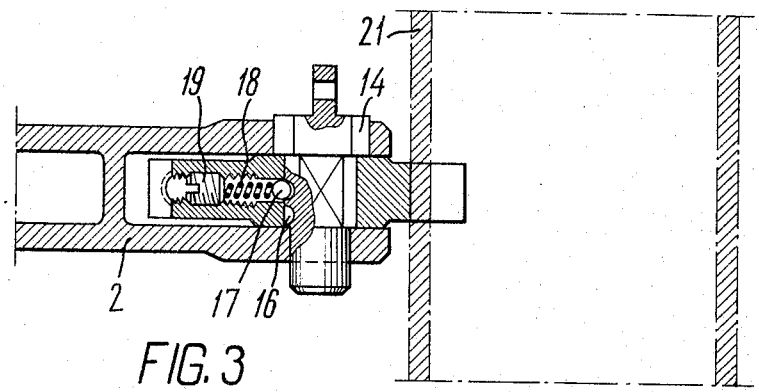
FIG. 3 is a cross-sectional view of a mandrel attached to a lever.
Figure 4:
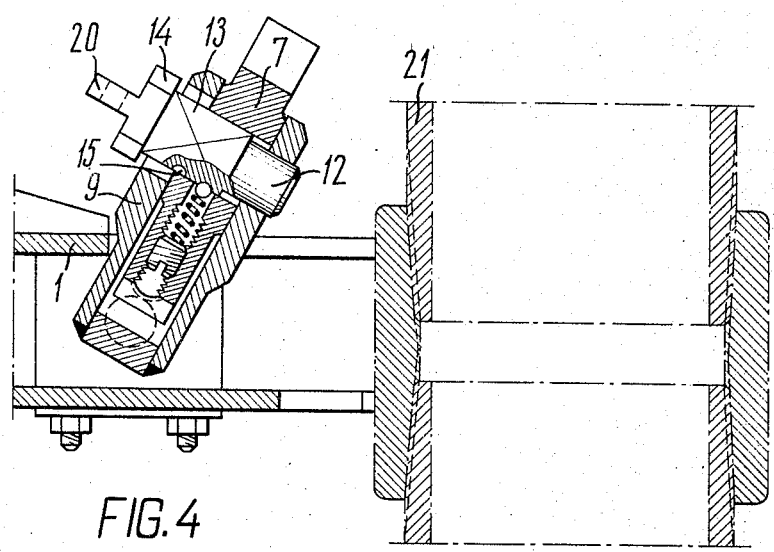
FIG. 4 is a cross-sectional view of an auxiliary mandrel shown in a position for allowing passage of a pipe-coupling joint.

FIGS. 3 and 4, in addition to the mandrels, show the stops and the three-section axles of the mandrels.

The device comprises a frame 1 with levers 2 mounted thereon by means of hinges 3. Each lever is connected, at one end, to a drive 4 which can be hydraulic or pneumatic. The other end of each lever carries mandrels 5 with surfaces 6 in the form of segments, the curvature of each segment being different. The surface of a segment may be serrated. The device can be provided with an auxiliary mandrel 7, the number and shape of surfaces thereof being similar to those of mandrel 5, said auxiliary mandrel being intended for centering the device relative to the pipe being gripped. The mandrel 7 is fastened, by means of an axle 8 to a flap body 9 which, in turn, is fastened in bearings 11 on the frame 1 by means of axle 10, the fastening being such as to allow the flap body to swivel.

The axle 8 is identical for all the mandrels and has three sections, viz. a lower cylindrical section 12, a middle section 13 in the form of a square prism and an upper section 14 in the form of a polyhedral prism. One of the sides of the middle section 13 has an upper recess 15 and a lower recess 16 which admit a ball 17 under the action of a spring 18 retained by a plug 19 of a stop located in the mandrel body. The axle 8 has a boss or lug 20 for placing the axle vertically relative to the stop and for turning the axle and the mandrel in either direction relative to pipe 21.

There is now described the operation of the pipe-gripping device.

The device is arranged over the well head so that the levers are horizontal on both sides of the pipe and, when moved to meet each other by the drive, are capable of gripping the pipe with their mandrels.

If the pipe coupling joint is to be passed through when lowering or lifting the pipes, this can be done by the simple opeartion of moving the levers with the mandrels apart by means of the drive 4 and by upwardly pivoting the auxiliary mandrel, whose descent is precluded by the lower wall of frame 1.

When a pipe of another diameter is to be handled, each mandrel is turned to face the pipe with the surface whose radius of curvature corresponds to that of the wall of the pipe to be gripped. The mandrel is turned by means of the axle on which the mandrel is supported. For this purpose, it is sufficient to slightly displace the axle axially so that the ball 17 of the stop located in the mandrel body will move from the upper recess 15 to the lower recess 16 which is also provided in the wall of the middle section of the axle. Such position of the stop allows the mandrel to be turned in any direction and brought to the pipe with the necessary surface by slightly turning the axle, after which the mandrel can be locked in the required position by axially moving it to its original position in which ball 17 is engaged in recess 15. For handling pipes of other diameters, the procedure of turning the mandrels is repeated as above.

What we claim is:

1. A pipe-gripping device which comprises a frame, levers hingeably attached to said frame, a drive connected to said levers at one of the ends thereof for pivotally moving said levers; mandrels having segments with surfaces of different curvature, an axle supporting each mandrel at the other end of a respective lever to selectively allow relative rotation therebetween, each axle including three sections in axial arrangement, one end section being of a cylindrical shape, the opposite end section being in the form of a polyhedral prism and the middle section being in the form of a square prism and having two recesses in one of its sides, and a stop mounted in each mandrel and including a ball resiliently urged into engagement in one of the recesses in said axle, each said axle being axially displaceable in the associated mandrel between two positions in which said ball is engaged in respective recesses, the mandrel being rotatable relative to the associated lever with the axle in one of said positions, and being locked against rotation with the axle in the other of said positions.

2. A pipe-gripping device as claimed in claim 1 comprising an auxiliary mandrel mounted on the frame between the levers and having segments with surfaces corresponding to those of the segments of the mandrels on the levers.

3. A pipe-gripping device as claimed in claim 2 comprising an axle having three sections and a stop for said auxiliary mandrel corresponding to those of the mandrels on the levers.

References Cited
UNITED STATES PATENTS

| | | | |
|---|---|---|---|
| 1,531,377 | 3/1925 | Clarke | 269—321 |
| 2,821,317 | 1/1958 | Locke | 294—106 X |

GERALD M. FORLENZA, *Primary Examiner.*

G. F. ABRAHAM, *Assistant Examiner.*